Figure 2:
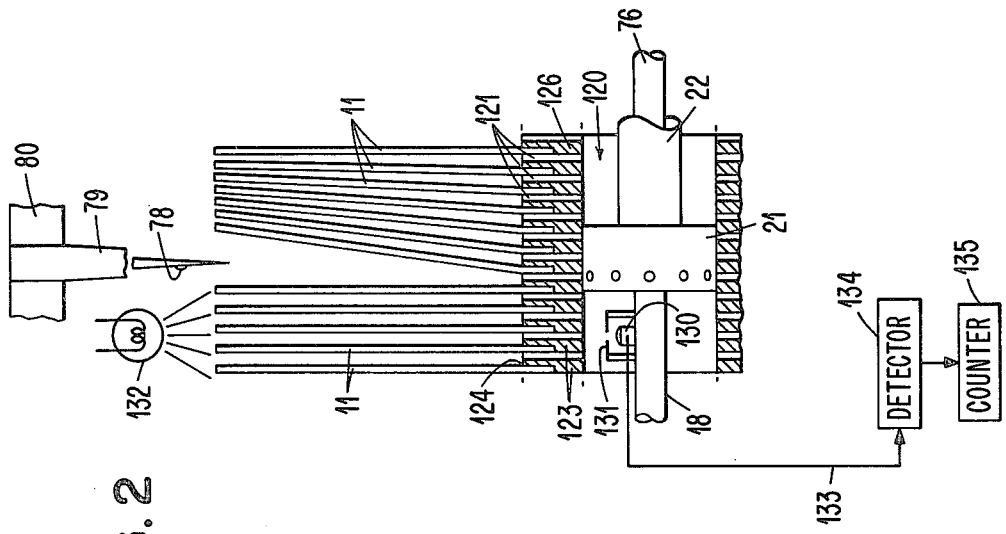

United States Patent [19]

Van Winkle

[11] 4,191,981
[45] Mar. 4, 1980

[54] RECORD STORAGE APPARATUS EMPLOYING ENHANCED TRANSDUCER POSITIONING SERVOMECHANISMS

[75] Inventor: Howard E. Van Winkle, Boulder, Colo.

[73] Assignee: International Business Machines Corporation, Armonk, N.Y.

[21] Appl. No.: 642,646

[22] Filed: Dec. 19, 1975

[51] Int. Cl.² .................. G11B 5/012; G11B 5/016; G05B 11/18
[52] U.S. Cl. ............................ 360/99; 360/98; 318/593
[58] Field of Search ............... 360/98, 99, 75, 78; 318/593

[56] References Cited

U.S. PATENT DOCUMENTS

| 3,757,192 | 9/1973 | Asano et al. | 318/593 |
| 3,936,880 | 2/1976 | McGinnis et al. | 360/98 |
| 3,940,794 | 2/1976 | Griffiths et al. | 360/98 |
| 4,011,590 | 3/1977 | Orlando | 360/99 |

Primary Examiner—Robert S. Tupper
Attorney, Agent, or Firm—Herbert F. Somermeyer

[57] ABSTRACT

A sequentially operated machine employs two positionable members, a movable center selection piston member and a movable transducer member for accessing a record storage member selected by the central piston member. Making the record storage member available to the transducer reuires a predetermined time delay. Accordingly, the servomechanism powering the selecting mechanism has a high response, while a following servomechanism transporting the transducer has a low response such that cost is reduced while not adversely affecting access time to the record member.

5 Claims, 2 Drawing Figures

RECORD STORAGE APPARATUS EMPLOYING ENHANCED TRANSDUCER POSITIONING SERVOMECHANISMS

BACKGROUND OF THE INVENTION

The present invention relates to positioning servomechanism apparatus and methods particularly adapted for use with record storage apparatus employing a stack of flexible record storage disks or other sequentially actuated apparatus and also particularly to methods and apparatus for accessing a record surface on any selected one of the disks in a stack of disks.

Record storage apparatus employing a stack of flexible record storage disks have been shown in U.S. Pat. Nos. 3,852,820 and 3,838,462. These patents show mechanical disk separation for generating a transducer access opening in the stack of disks. Methods of fluidic access opening generation, as described herein, appear to have certain advantages over mechanically generating an access opening. However, changing air flow for inducing an access opening requires a certain amount of time. This time requirement means increased access time to a given record surface.

In a data processing system, such increased accessing time diminishes the value of the record storage apparatus within a data processing system by increasing the total cost of operation of the system. Accordingly, it is desirable to control access time while maintaining low cost of positioning servoes in record storage apparatus employing fluidic storage apparatus.

SUMMARY OF THE INVENTION

An object of this invention is to provide a low-cost, high-performance, dual-positioning servomechanism adapted to be used with and methods for operating automatic machines having overlapped operations. A feature of the invention is a pipeline type control for plural servomechanisms.

In accordance with the invention, positioning apparatus for selectively moving first and second members with respect to a third member such as the frame of a machine and a record storage apparatus supported on the frame of the machine includes a first servomechanism having motive means for relatively moving the first and third members to a commanded position. Further, a second servomechanism has motive means for relatively moving the second and third members in accordance with the first and third member relative movement, but is only capable of relative movements slower than the first servomechanism relatively moving the first and third members with the commanded means operating the first servomechanism before the second servomechanism. The delay of the second servomechanism with respect to the first servomechanism is preferably adjusted for operations performed by the third member in response to the first member having arrived at a commanded position and to a function initiated in accordance with the first member arriving at such a position.

A method of the invention includes operating a machine in a series of mechanical operations at a given location within the machine. The machine has three relatively movable machine members for enabling a given machine operation. The method includes relatively moving first and third machine members at a first rate to a commanded relative position yielding a predetermined locational relationship to the given location at which the function is to be performed, then indicating such relative position and performing a machine mechanical function from the commanded position which effects a given machine mechanical status at a given location in preparation for performing the desired machine operation. Concurrent to performing the preparatory machine function, the second and third members are relatively moved with respect to said given location at a given rate allowing full overlap of the preparatory machine function with the second positioning movement and then, finally, performing the machine operation at the given location at the conclusion of the preparatory machine operation and of the second movement.

In a preferred form of the machine, a plurality of record storage members which are closely packed are selectively separated at a given location of the machine for enabling transducing access. A disk separator first moves rapidly to a disk separating position. Once it reaches the commanded position for disk separation, it initiates disk separation which takes a predetermined time. Substantially concurrently, therewith, a transducer having a low motive servomechanism moves toward the position of the record members where the separation of record members for enabling transducing access is being performed. Upon completion of the second movement and of the separation, the transducer is moved into the interstice formed by separating the record members. The above arrangement enables reduced cost of the second servomechanism without sacrificing increased access time for the record storage apparatus.

The foregoing and other objects, features, and advantages of the invention will become apparent from the following more particular description of the preferred embodiment, as illustrated in the accompanying drawing.

THE DRAWING

Figure 1:
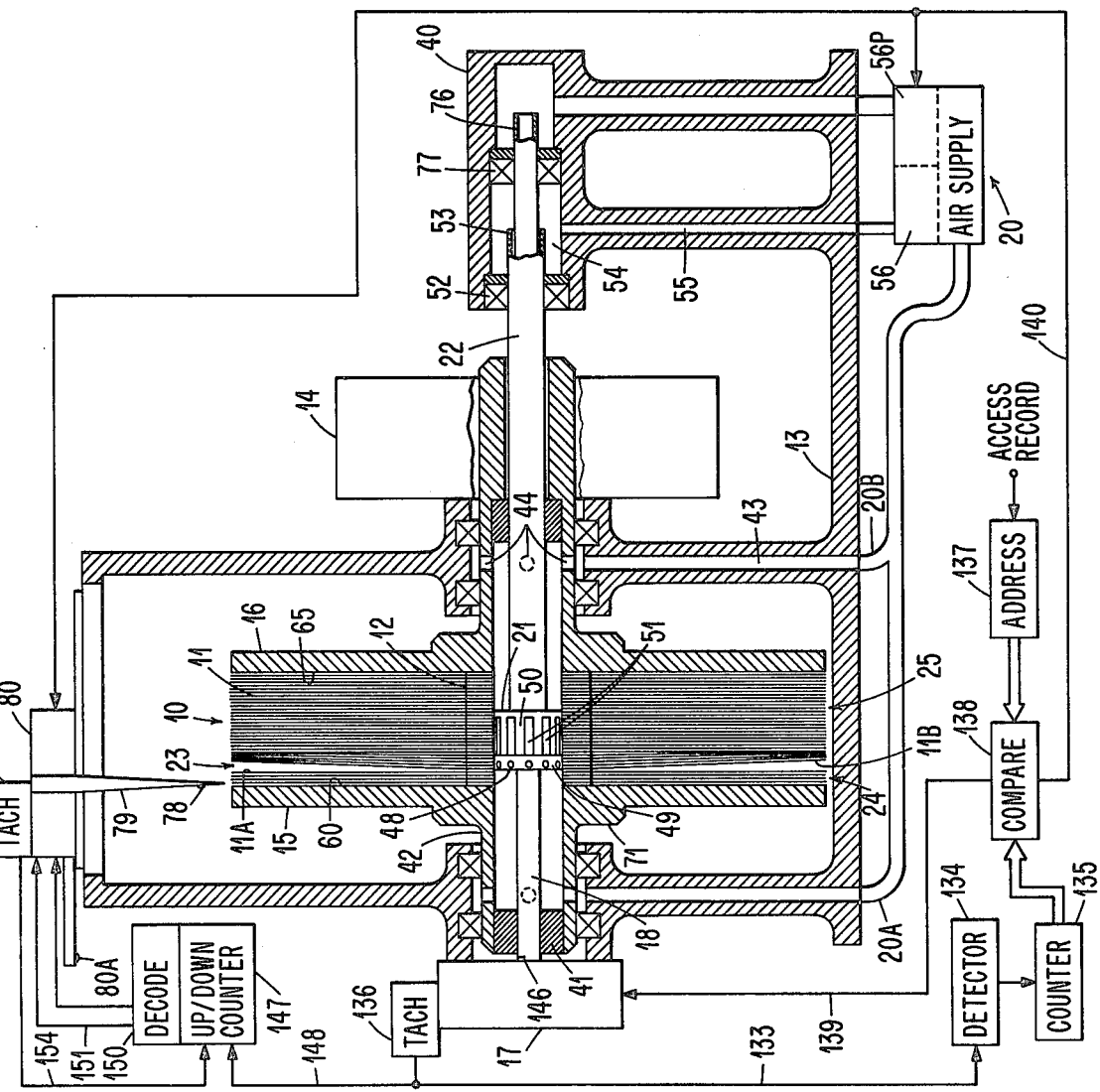

FIG. 1 is a diagrammatic showing of a record storage apparatus employing the present invention.

FIG. 2 diagrammatically shows one construction of a tubular spindle usable with the illustrated apparatus.

RECORD STORAGE APPARATUS

Referring now more particularly to the drawing, like numerals indicate like parts and structural features in the various views and diagrams. Record storage apparatus incorporating the present invention has a stack 10 of a plurality of flexible record storage disks 11 mounted at their centers on a tubular spindle 12 for rotation about a common axis. Frame 13 supports spindle 12 for rotation at its axially opposite ends. Motor 14 rotates the stack 10 at a constant angular speed. The speed can be controlled by slaving motor 14 to a desired data rate. A pair of stabilizing end plates 15 and 16 assist in stabilizing rotation of the stack 10 of disks 11. Such end plates are preferably more rigid than record disks 11. Stack 10 is constructed in accordance with Penfold et al U.S. Pat. No. 3,867,723, wherein air from a central supply 20 flows through tubular laminated spindle 12 and, thence, radially outward through interstices between adjacent ones of the disks 11 for stabilizing same. Transducing access can be enabled from the tubular spindle 12 by utilizing a central selection piston 21 which is axially movable inside spindle 12.

To achieve an access opening with minimal air flow change, the piston 21 has its own separate air supply tube 22 connected to air supply 56. An annular access opening 23 is created adjacent a record disk 11A rotating under stabilized influence of air moving radially outwardly from tubular spindle 12, while axially adjacent disks 11B axially move away from disk 11A at their outer peripheries to create annular access 23. The term "access opening" is also termed "stack split"; closing an access opening also "closes" the stack (pack) to fully space the disks as later described. Positioning piston 21 and appropriate resultant controlled air flow, which is altered from the stabilizing air flow in areas 24 and 25 of stack 10, creates annular access opening 23 with minimal air pressure/movement changes, as will become more apparent.

An early embodiment of the present invention had axially movable piston 21 fixedly secured to a free end of axially elongated support tube 22, which in turn was journaled for rotation in end support 40. End support 40 is disposed on frame 13. A voice coil motor 17 secured on frame 13 axially moves tube 22 and piston 21 via actuating rod 18. Seal 41 provides an air seal to the center of tubular spindle 12. In view that piston 21 and the inner wall of tubular spindle 12 form an effective air seal, air supply 20 had fluid communication with both axial ends of tubular spindle 12. Air supply 20 supplies stabilizing air pressure through tubular support shaft 42 via tube 20A to the center of tubular spindle 12. This arrangement supplies air to that portion of the disk pack for stabilizing disks in area 24. At the opposite axial end, air supply tube 20B supplies stabilizing air pressure through tube 43, thence, apertures 44 to tubular spindle 12. Motor 14 is coaxially disposed over tube 22.

Piston 21 has a transducer access opening front edge 48 adjacent an air blocking portion 49, which in turn is adjacent a bistable air pressure supplying portion 50. Front edge 48 identifies and selects record disk 11A for transducing access. All disks to the left of disk 11A in area 24 have stabilized air flow, hence, are rotating in a stabilized rotational condition. To the right of disk 11A, a first set of disks 11B, which is generally axially aligned with air pressure blocking portion 49 of tubular piston 21, is in a minimal spaced stable rotational region. As a result, annular transducer accessing opening 23 exists between disk 11A and facing disk surface 26 of group 11B disks. The access opening front edge 48 of tubular piston 21 is preferably somewhat aligned with the plane of the record storage disk 11A to be selected.

Bistable portion 50 of closed tubular piston 21 passes the bistable inducing air through a series of ports 51 which are uniformly, circumferentially disposed about the piston 21 periphery. The inside of piston 21 is a small plenum receiving the bistable inducing air through elongated tube 22, which in turn is journaled for rotation in end support 40 at 52. The axial end 53 of tube 22 is in fluid communication relationship with a plenum 54 integrally formed in end support 40. Plenum 54, in turn, receives bistable inducing air pressure through passageway 55 from bistable air source 56.

In one version, bistable source 56 was continuously operated such that annular access opening 23 always existed in the stack of disks 10. As piston 21 was axially moved, access opening 23 followed the front access opening generating switch 48. In an alternative embodiment, an actuating switch (not shown) turned bistable source 56 on to supply bistable air; while at other times, it supplies stabilizing air such that access opening 23 is more poorly defined. Because of reduced access time, it is preferred that bistable source 56 continuously supplies bistable inducing air pressure to tube 22 and section 50 of piston 21.

The stroke of piston 21 in tubular spindle 12 extends from immediately adjacent face 60 of rigid stabilizing end plate 15 to face 65 of plate 16. At the bottom of the stroke of piston 21, as near face 60 of rigid disk 15, it is preferred that the stroke be terminated such as to avoid inadvertent contact with face 60.

At the top of the stroke (adjacent rigid end stabilizing plate 16), design choice can be exercised more freely for selecting the length of the stroke of piston 21. It is preferred that the stroke of piston 21 be as long as possible and encompass the maximum number of disks. In one constructed embodiment, access opening 23 had an outer axial maximum extent of less than three millimeters; hence, the stroke stopped about three millimeters from face 65 of rigid stabilizing end plate 16.

Rigid disk plate 15 has an axially outwardly extending boss 71 having shaft 42 journaled for rotation in frame 13 for supporting end plate 15 and, hence, tubular spindle 12. Further, since piston 21 on support tube 22 is journaled in end support 40, piston 21 does not rotate with stack 10. This arrangement requires rotatable air seals in end support 40. It is also preferred that in constructing tubular spindle 12, it be precisely bored for its entire axial length for ensuring no interferences in the sliding action of piston 21. It is also preferred that the outer periphery of piston 21 be of nylon or other antifriction material to facilitate axial movement and precise positioning of the piston.

To assist in forming annular access opening 23, a set of high-pressure jet ports (may be slits) are circumferentially, evenly disposed about the periphery of piston 21. These ports are in fluid communication with high-pressure, air-transmitting tube 76 disposed coaxially with air pressure tube 22. Tube 76 is journaled in slide 40 at 77 and is in fluid communication with a pulsed air supply 56P within supply 20. Air supply 56P is activated by means (not shown) a little before the pulsed bistable source 56 is activated, or it can be continuously providing jets of air preferably pulsed just prior to the insertion of a transducer 78 carried by radially movable arm 79 on axially movable carriage 80 into annular access opening 23. The latter is preferred since the jet of air will ensure that annular access opening 23 reliably occurs at a given location and expands to a desired maximum axial spacing. It has also been determined that if the air jet precedes application of bistable condition inducing air flow, annular access opening 23 opens faster than if simultaneously or subsequently applied.

Piston 21 control portions 49 and 50 may vary in construction while accomplishing the above-described functions. For example, portion 50 may actually provide radially outwardly flowing air at a reduced pressure from that provided from air source 20. Portion 49, instead of blocking flow of air from the disks in region 11B, may be connected to a pulsing vacuum source (not shown) which actually causes a momentary reverse flow of air; i.e., the air flows momentarily radially inwardly and at other times radially outwardly. The latter tends to cause the disks in region 11B to move together more rapidly. Additionally, the pressure provided by portions 49 and 50 to the disks in the areas 11B and 11C, respectively, may vary in accordance with the operation of the device; that is, immediately prior to insertion of transducer 78 into access opening 23, air can be jetted through ports 75, a vacuum or reverse air flow pulled through portion 49, and a slightly less pressure momentarily provided through portion 50, which then can be increased to a desired bistable air pressure once the transducer 78 enters access opening 23. Also, the vacuum may be of relatively short duration. Because time is of essence in the insertion of transducer 78 into access opening 23, various design parameters to achieve minimum time required to generate an access opening or to ensure the access opening is sufficient; and various choices can be made depending upon the characteristics of the stack of disks being employed. To pull a vacuum through portion 49, it is fitted with ports (not shown) and connected to a vacuum source (not shown) via a tube (not shown) in the same manner that portion 50 connects to source 56 via tube 22.

It is desired that the maximum axial extent of access opening 23 be minimized. That is, a small opening is achievable in the shorter period of time than a large opening. However, this has to be offset with the positioning accuracy and speed of axial movable carriage 80 and radially movable head support arm 79. Further, the techniques of this present invention can be combined with that in the copending, commonly assigned application of Griffiths et al, Ser. No. 480,990, filed June 19, 1974, now U.S. Pat. No. 3,940,794, wherein the initial opening of the stack 10 is in accordance with the teachings of the present invention wherein the opening axial extent is less than that necessary to accommodate radial arm 79. Insertion of radial arm 79 into such partial access opening partially moves the disk 11B axially as taught in Griffiths et al, supra. In this manner, the positioning accuracy requirements of axially movable carriage 80 are induced while permitting facile and assured access to stack 10 and overlapping operations of the radial access of transducer 78 with the formation of a transducer access opening of sufficient axial extent to accommodate arm 79. This is particularly useful whenever ports 75 provide an additional surge of air past disk 11A and those of 11B to ensure that arm 79 and the adjacent disks do not come into damaging contact. Carriage 80 and radial arm 79 may be constructed as shown in Griffiths et al, supra, and provide an additional jet of access opening air coincident with an internal air jet via port 75.

Tubular spindle 12 is preferably constructed as diagrammatically shown in FIG. 2 in partial cross-sectional view. The interior of tubular spindle 12 is a coaxial air passageway 120. The tubular wall of spindle 12 has radially extending axially elongated air passageways 121 which are axially extending grooves in fluid communication with central air passageway 120. Each of the grooves, or air passageways 121, also are in fluid communication with the interstice between adjacent record storage disks 11. Each record storage disk is supported by its own individual annular spacer, such as spacers 123. Each annular spacer 123 has an annular outer shoulder 124. The disks 11 are suitably respectively adhesively secured in the shoulders 124. The axial depth of these shoulders is preferably less than the thickness of the disks 11 such that when a bolt (not shown) extends axially through the spacers between rigid stabilizing plates 15 and 16, the disks 11 are slightly compressed for ensuring a solid attachment for all the disks to tubular spindle 12. The radial inward portions 126 of each washer 123 have a maximum axial thickness such that those inward portions 126 abut adjacent spacers radially inwardly of each of the disks 11. Such contact controls the clamping force on disks 11 and provides for a rigid solidifying clamping force for the entire stack 10.

Piston 21 is moved to a predetermined axial position within tubular spindle 12 in accordance with a servomechanism commanded by means (not shown) as shown in FIG. 2. A photosensor 130 mounted on tube 22 has a predetermined precise axial position with respect to piston 21. Further, an optical mask 131 is disposed intermediate photosensor 130 and the plurality of radial ports 121 of tubular piston 12. Light from source 132 tends to become collimated in the interstices between disk 11 and proceeding through ports 121 to mask 131, thence photosensor 130 for accurately indicating position of piston 21. The sensed light and dark areas are transmitted as signals over line 133 to a detector 134 which actuates counter 135 to indicate axial position of piston 21 within tubular spindle 12. Using known positioning techniques with respect to counter 135, piston 21 is accurately positioned by voice coil motor 17 to a commanded position. It is understood that voice coil motor 17 is constructed to provide fast movement of piston 21 within tubular spindle 12. Upon reaching the commanded position, the air jets from source 56P are actuated as hereinafter described.

Referring again to FIG. 1, the above-described photosensor 130 can be replaced by a known linear tachometer, such as tachometer 136. In any event, either photosensor 130 or a linear tachometer 136 supplies incremental tachometer signals over line 133 via detector 134 to a counter 135. The tachometer signals are directional in that they can be a two-phase signal (not shown) or that the direction of actuation of voice coil 17 indicates positive or negative direction. In any event, counter 135 is either counted up or down in accordance with known techniques to indicate the present position of piston 21. The desired address indicated in address register 137 supplies the signals to compare circuit 138 which compares the desired address with the indicated address from counter 135. Compare circuit 138 supplies a position error signal over line 139 to actuate voice coil motor 17 in a known manner. Further, when the compare is equal, compare 138 supplies an activating signal over line 140 to actuate pulse air supply source 56P to supply a pulse of air through the ports of piston 21 for ensuring a fast opening of 23.

In accordance with the invention, carriage 80 is actuated to follow the axial positioning of piston 21. This can be done in several manners. A first method is that the carriage 18 connecting piston 21 to voice coil motor 17 may have a reference indicia mark 146 to be optically sensed by means 80A fixedly secured to carriage 80. Carriage 80 is then positioned using known techniques to follow the reference indicia mark 146. In the alternative, digital controls actuate the servomechanism (not shown) of carriage 80 to position transducer 78 axially with respect to transducer opening 23. In this regard, tachometer signals from tachometer 136 (which includes a photosensor 130 in a preferred embodiment) actuate up/down counter 147 identically to counter 135. That is, the signals on line 148 from tachometer 136 indicate direction of motion for either up counting or down counting counter 147. Decode 150 responds to the count in counter 147 to supply a follow position error signal over line 151 to the servomechanism (not shown) in carriage 80. A tachometer 152 on carriage 80 measures the axial position of carriage 80 with respect to the U-shaped frame 153 mounted securely on frame 13. Tachometer 152 supplies carriage 80 position-indicating signals over line 154 to actuate counter 147 in the direction opposite to the signals of line 148. Accordingly, when carriage 80 reaches the desired position corresponding to the desired position of piston 21, which may be axially offset from the actual axial position of carriage 80, counter 147 should be at zero. Such incremental follow servomechanism techniques are shown in U.S. Pat. No. 2,537,437 (expired). The present invention teaches that the motivating servomechanism operating carriage 80 has a lesser power than voice coil motor 17, hence, operates carriage 40 at a lower rate than voice coil motor 17 actuates axial movement of piston 21.

Exemplary times of operation are that piston 21 will take 236 milliseconds to reach its commanded position. Interstice 23 is formed in the commanded position in 164 milliseconds. Carriage 80 reaches its desired position in 500 milliseconds, the sum of the access times of piston 21 and of access opening 23 opening time. Once carriage 80 reaches the desired position, a separate servomechanism (not shown) within carriage 80 radially moves arm 79 into access opening interstice 23.

While the foregoing and other objects, features, and advantages of the invention have been particularly shown and described with reference to a preferred embodiment thereof, it will be understood by those skilled in the art that various changes in form and detail may be made therein without departing from the spirit and scope of the invention.

What is claimed is:

1. Positioning apparatus for relatively moving first and second members with respect to a third member, including in combination:
    a first servomechanism having motive means for relatively moving said first and third members to a commanded position;
    means for indicating relative position of said first and third members at least at said commanded position;
    a second servomechanism having motive means for relatively moving said second and third members in accordance with said indication including means comparing said indication with relative position of said second and third members for stopping said relative movement of said second and third members upon obtaining a predetermined comparison and for actuating said relative movement of said second and third members upon other than said predetermined comparison and said second servomechanism only being capable of relatively moving said second and third members slower than said first servomechanism relatively moves said first and third members whereby said first and second members are first relatively positioned to said commanded position such that said second servomechanism follows the positioning movements of said first and third members with a predetermined time lag.

2. The positioning apparatus set forth in claim 1 wherein said third member has a plurality of relatively movable operating portions;
    fourth means in said first member to relatively move predetermined ones of said operating portions in a preset pattern;
    means activating said second servomechanism at least in some concurrency to said fourth means relatively moving said predetermined portions;
    fifth means relatively movably mounted on said second member for movements toward and away from said third member;
    control means responsive to said second servomechanism having moved said second and third members in accordance with said indication to enable said fifth means to move toward said predetermined relatively moved portions; and
    operation means on said fifth means for performing a machine operation in coaction with one of said predetermined relatively moved portions.

3. The apparatus set forth in claim 2 wherein said third member includes a plurality of flexible record members having a predetermined spacing and being separable;
    said first member being a record member selecting means relatively movable transverse to the plane of said record members and including actuating means for separating predetermined ones of said record members in accordance with its transverse position to said plurality of record members;
    said first servomechanism operating said selecting means;
    tachometer means on said first member for indicating its relative position;
    compare means;
    address means supplying a signal to said compare means such that said compare means compares the present position of said disk selecting member with respect to the address in said address means, and said compare means supplying an equal signal when a comparision is detected;
    said second member including a transducer member;
    means on said second member radially movably mounting said transducer member; and
    said second member including carriage means relatively movable transverse to said planar record members and including means sensing relative position thereof and including means for actuating said radially movable means for moving said transducer member into transducing engagement with one of said record members.

4. The apparatus set forth in claim 3 wherein said record members are a planar flexible circular record storage disk mounted for rotation as a unit about a given axis;
    said selector member being coaxial with said record disk and being axially movable to the interior of said disk; and
    said second member being movable at the periphery of said record storage disk with said radially movable means being movable for inserting said transducer member in the envelope formed by said record members for enabling transducing operations.

5. The method of operating a machine in a series of mechanical operations at a given location within the machine;
    the steps of relatively positioning three relatively movable machine members for enabling a given machine operation;
    relatively moving first and third machine members at a first rate to a commanded relative position having a predetermined locational relationship to said given location;
    indicating the relative position of said first and third members;
    performing a machine mechanical function from said commanded position which effects machine mechanical status at said given location in preparation for performing said machine operation;

concurrent to performing said mechanical machine function, relatively moving second and third members in accordance with said indication and at a rate less than said first rate to a following location having a predetermined locational relationship to said commanded and given locations; and performing said machine operation at said given location by coaction of said second and third members from said following location.

* * * * *